Aug. 2, 1949.  L. E. SMITH  2,477,835

THERMOMETRIC APPARATUS

Filed Oct. 19, 1944

INVENTOR.
Lawrence E. Smith
BY
E. C. Sanborn
Attorney

Patented Aug. 2, 1949

2,477,835

UNITED STATES PATENT OFFICE 2,477,835

THERMOMETRIC APPARATUS

Lawrence E. Smith, Hubbardston, Mass., assignor to The Bristol Company, Waterbury, Conn., a corporation of Connecticut Application October 19, 1944, Serial No. 559,419

12 Claims. (Cl. 236—79)

This invention relates to fluid-filled thermometers and more especially to a thermometer system of the type having a variable-volume element such as a Bourdon spring connected by means of a capillary tube to a closed container or bulb, the whole enclosure so formed being filled with a volatile or expansible fluid. Thermometer systems of the above class, while sensitive, and possessing considerable force, whereby to position an indicating, recording, or controlling member, are inherently subject to the time lag attendant upon the transfer of heat from the surface to the whole mass of the fluid within the bulb, and consequently are characterized by a response delay which may materially impair the merit of the instruments in which they are employed.

It is an object of the present invention to provide means whereby the characteristic over-all time of response in a thermometer of the fluid-filled type may be materially lessened and the attainment of final readings correspondingly facilitated.

The invention also comprises the provision of means of the above nature having an "overshooting" characteristic, which, while not interfering with the normal purposes of the instrument shall be advantageous in the actuation of contacts or other control couples in automatic regulation of temperature.

In implementing the purposes of the invention it is proposed to provide a thermometer comprising in combination two independent fluid-filled systems having differing time-response characteristics, and different sensitivities, whereby, under the joint influence of said systems, the pointer, index, or control element to be positioned will attain its final reading or indication in a shorter time than would characterize the response of a single system.

Other features of the invention will be hereinafter described and claimed.

Figure 1:
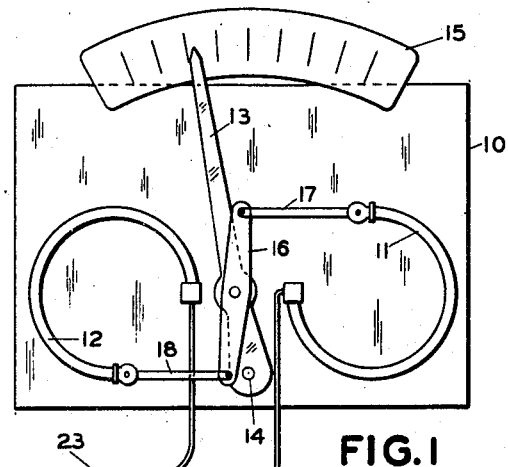
Fig. 1 is a front elevation of an indicating thermometer embodying the principle of the invention.

In Fig. 1 is shown an indicating thermometer embodying the principle of the invention. Upon a base-plate 10 are mounted two Bourdon springs 11 and 12 each adapted to deflect upon the application of internal pressure. Intermediate said springs is positioned an index or pointer 13 adapted for limited angular deflection about a pivot mounting 14 upon the base plate 10. A measure of the degree of said deflection is provided by means of a graduated scale 15 fixed upon the base 10, and juxtaposed to the index 13. An extended lever arm 16 is pivotally mounted intermediate its extremities upon the pointer 13, whereby to be angularly deflected about an axis parallel to, but displaced from that of the pivot mounting 14 and movable with said pointer. Said extremities are operatively connected to the Bourdon springs 11 and 12 by means of link members 17 and 18 respectively, whereby said lever arm constitutes a differential lever, rendering the pointer 14 subject to the joint influence of said Bourdon springs and adapted by its angular deflection about the pivotal mounting 14 to provide a measure of the arithmetical difference of their deflections. The arrangement, furthermore, is such that deflection of the Bourdon spring 11 in response to an increase of internal pressure will act through the link 17 upon the differential lever 16, which, pivotally mounted about the point of attachment of the link 18, will cause the index 13 to be deflected in a positive sense with respect to the graduation of the scale 15. Similarly, a deflection of the spring 12 in response to an increase of internal pressure will cause the index 13 to be deflected in a negative sense with respect to said scale. In the interests of simplicity of calibration and of proper scale proportionality it is desirable that the pivot point at which the link 18 is attached to the differential lever 16 follow a path wherein at one position the axis of said pivot point may coincide with the axis of the stationary pivotal mounting 14.

A bulb 20, connected by means of a capillary tube 21 to the Bourdon spring 11 provides therewith an enclosed space adapted to be filled with an expansible or a volatile fluid or combination of the same, whereby variations of the pressure of said fluid due to changes in the temperature to which the bulb 20 is exposed will cause the Bourdon spring to be more or less deflected in response to said changes. An enclosed bulb 22, which for a liquid-filled system will be of considerably smaller internal volume than the bulb 20, is similarly connected to the Bourdon spring 12 by means of a capillary tube 23. In the case of gas-filled or vapor-tension systems, the bulbs may be made of the same internal volume, and a difference in their sensitivities obtained by suitable difference in the quantity, quality, or initial pressure of the filling fluid. In general, the bulb 20 is given a faster time response and a greater sensitivity than the bulb 22. (The term "sensitivity" as herein used may be defined in accordance with one of its commonly accepted meanings as designating the degree of response of the deflecting element in relation to a given change of the measured magnitude.)

Since the effects of similar pressure changes within the bulbs 20 and 22 upon the deflection of the pointer or index 13 are in opposite senses, it follows that the position attained by said pointer or index when a state of equilibrium exists will represent the difference in their calibrations. Adjustment is made such that temperature readings obtained with the bulb 20 alone in action will be greater than the true value of temperatures to which said bulb is exposed. The discrepancy between said readings and true temperature values is incorporated in the calibration of the smaller bulb 22, which tends to deduct from the deflection of the pointer an amount sufficient to provide a correct reading on the scale 15.

In operation, the bulbs 20 and 22 are placed in close thermal association so that they will both assume the temperature of the body or space upon which measurement is to be performed. While a steady condition exists, the joint influence of the two thermometer systems as imparted to the pointer or index 13 through the differential lever 16 and associated linkages will provide a true temperature reading upon the scale 15. Upon a change in temperature, the larger and more sensitive bulb 20 will be the first to respond, and will tend to cause the pointer or index 13 to approach its ultimate reading at a relatively rapid rate, to the extent that it may overshoot the calibrated point which corresponds to the actual temperature value. The bulb 22 and its associated system, while beginning to act at the same time as the system connected to the bulb 20, will lag behind the same, but will succeed in restoring the pointer or index 13 to the true temperature reading after an interval depending on the relative time response of the two bulb systems. The tendency, therefore, will be for the index 13 upon any change in measured temperature, to approach the true reading at a relatively rapid rate overshooting the same, and then being restored to the correct value by the action of the bulb 22 and its associated system.

Figure 2:
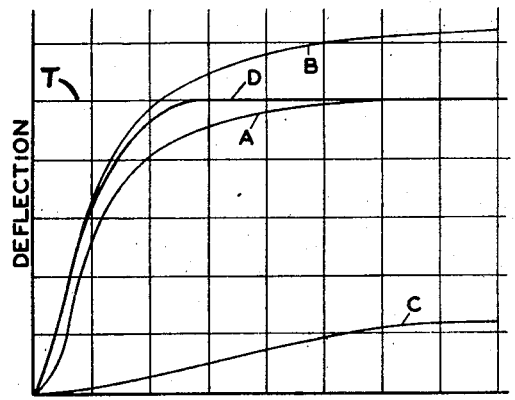
Figs. 2 and 3 are graphic representations of the performance of thermometers embodying the principle of the invention.
Figure 3:
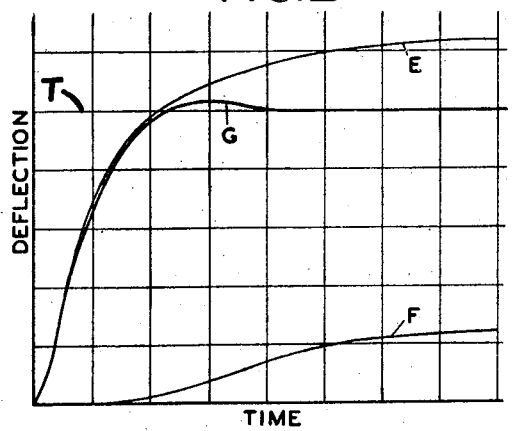

The coordinated operation of the two bulbs having differing characteristics will be better understood by reference to the graphs shown in Figs. 2 and 3, wherein are plotted the deflections of the responding elements associated with the two bulbs over a lapse of time prior to and immediately following, the attainment of a steady-state condition. In each of these curves the zero of the vertical coordinates represents a reference temperature or steady-state value at which the bulb systems are assumed to be in equilibrium, and the ordinate value represented by the line T corresponds to the temperature to be measured, and to which the bulbs are simultaneously and instantaneously exposed. The curve "A" represents the characteristic response of a single bulb having a system calibrated to read the actual temperature under measurement. It will be noted that the initial response may be characterized by a slight delay representing the time of transfer of the temperature change through the walls of the bulb, which of course provides no response. As heat from the source to be measured reaches the fluid within the bulb, expansion begins and the response follows a substantially exponential law whereby the exhibiting member asymptotically approaches a true indication of the temperature to which the bulb is exposed.

As indicated in Fig. 2, the response curve "A" reaches 90% of its final value in three time units, and, if the curve were truly logarithmic, would attain 99% in six time units, and so on until the discrepancy between the indicated and the true values becomes negligible. As hereinbefore pointed out, the principal object of the present invention lies in reduction of time delay between a change of temperature to which the sensitive element is exposed and the ultimate indication of its value on the instrument scale.

The characteristic response of the Bourdon spring 11 in Fig. 1, in conjunction with the bulb 20, and without the modifying influence of the bulb 22, is as indicated in the curve "B" of Fig. 2 wherein the system, being of greater sensitivity than otherwise necessary, reaches an indication of the measured temperature in a relatively short time (two time units) and continues to increase according to the characteristic exponential law. The characteristic of the bulb 22 and associated system is made as indicated in the curve "C" of Fig. 2, wherein it will be noted that, while the ultimate sensitivity is much less, the time of response is made greater with respect to the ultimate value attained, than in the system represented by the curve "B."

By suitably proportioning the respective characteristics of the two bulb systems, which are differentially connected as shown in Fig. 1, it is possible to obtain a characteristic, which, while partaking of the rapid response of the more sensitive bulb, will eliminate the excess of the reading derived from that bulb over and above the true value to be measured. As the curve "C" rises much less rapidly than the curve "B" in the time interval immediately succeeding an increase in temperature, there is little resultant effect on the response of the exhibiting member subject to the joint influence of the two systems. As the excursion of the exhibiting device approaches the true value of the temperature under measurement, the effect of the bulb system corresponding to the curve "C" becomes progressively more pronounced; and, by so proportioning and selecting this characteristic that the magnitude of deflection derived from the bulb 22 will be equivalent to the excess of that derived from the bulb 20 above the measured value, it becomes possible to have the index or pointer follow the curve "D," wherein the ultimate reading is attained after the lapse of a relatively short time interval, and subsequently continues substantially unchanged so long as the temperature to which the bulbs are exposed remains constant.

In Fig. 3 is shown a group of curves similar to those in Fig. 2, the curve "E," which represents the performance of the more sensitive bulb, being identical with the curve "B" shown in Fig. 2. The curve "F," representing the performance of the less sensitive bulb, acting in opposition to the more sensitive, is so selected that the response delay is even greater than that represented by the curve "C" in Fig. 2. Thus, the ultimate response curve "G," due to the differential action of the two bulbs, actually overshoots the final reading "T" upon the initial deflection of the exhibiting element, and subsequently returns to the true value, where it remains so long as the temperature continues constant.

Methods by which the response of the less sensitive of the two associated bulbs may be delayed to any desired degree are well known in the art, and need here only be mentioned. The smaller bulb may be made with walls of relatively great thickness, requiring a correspondingly long time for temperature changes external to the same to be communicated to the fluid within the bulb, or use may be made of a material having a thermal conductivity relative low as compared with that of the larger bulb. Also, a time-delay characteristic may be introduced by choosing for the connection between the small bulb and its associated Bourdon tube a capillary tubing having a bore small in comparison with that of the tube connected to the larger bulb. Further variations in sensitivities and time response characteristics can be effected by the selection of filling fluids and their operating pressure ranges.

Figures 4, 5:
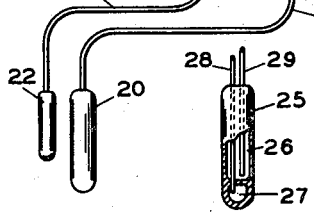
Figs. 4 and 5 are representations of bulbs which may be utilized alternatively to the form shown in Fig. 1.

In Figs. 4 and 5 are shown bulb constructions in which the above-mentioned, and other principles are used more or less in combination for the purpose of obtaining the desired relative response rate between the two bulbs. In Fig. 4 is shown a combination in which the functions of the main and auxiliary bulb units are incorporated in one integral assembly. A bulb member 25 is internally divided into a large chamber portion 26 and a small chamber portion 27, the latter having materially thicker walls than those of the portion 26. Communicating with the chamber portion 27 is a capillary tube 28; and communicating with the chamber portion 26 is a capillary tube 29. In use, the capillary tubes 28 and 29 are connected to operating elements in a manner identical to the corresponding tubes 21 and 23 in Fig. 1, whereby there is provided a differential thermometer having all the characteristics attributed to the form shown in Fig. 1. While the chamber portion 27 is shown as having thicker walls than the portion 26, the delayed response so obtained may alternatively be provided by forming the walls of chamber portion 27 of material having a lower thermal conductivity than that of the walls of the portion 26. For example, the walls of the portion 26 may be formed of copper, and those of the portion 27 of iron. Again, the whole bulb 26 may be constructed of such material as copper, and the smaller chamber portion 27 formed as an insert, providing either a thicker wall or a wall of material having a relatively low conductivity.

In Fig. 5 is shown an alternative form which may be assumed by the dual bulb constituting the basis of the invention. The main bulb comprises a closed chamber 30, and has in communication therewith a capillary tube 31 corresponding to the tube 21 shown in Fig. 1. Wholly enclosed within the chamber 30, and out of contact with its walls, is a smaller bulb 32 sealed from communication with the chamber 30, and having connected thereto a capillary tube 33, corresponding to the tube 23 in Fig. 1. The principle and performance of the form of bulb shown in Fig. 5 are substantially identical to those of that shown in Fig. 4, and to the combination of bulbs 20 and 22 shown in Fig. 1.

Figure 6:
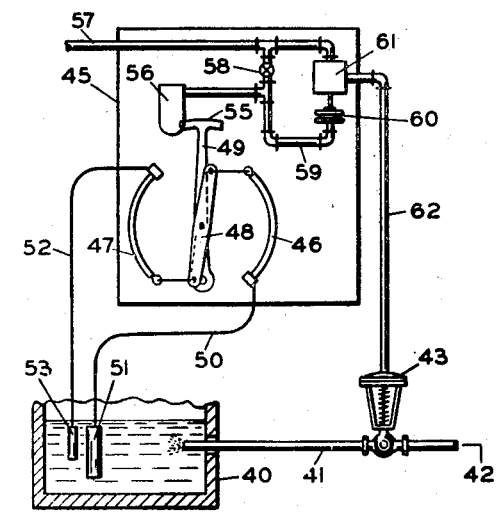
Fig. 6 illustrates the application of the invention to automatic regulation of temperature by pneumatic means.

The characteristic response of the bulb combination embodying the principle of the invention, in which there is a tendency for the initial excursion of the pointer or index to be exaggerated and subsequently withdrawn as graphically shown in Fig. 3, may be utilized to considerable advantage in providing an "anticipatory" characteristic in certain classes of automatic temperature control. In Fig. 6 is shown an application of the principle to a pneumatic temperature controlling system of a conventional type. A tank or reservoir 40 adapted to contain a body of liquid whose temperature is to be maintained at a predetermined constant value, is provided with an inlet conduit 41, through which may be admitted steam or some other temperature-affecting agent from a source 42 under the control of a pneumatically actuated valve 43. A controlling instrument 45 includes a pair of Bourdon springs or equivalent elements 46 and 47, corresponding in all respects to the elements 11 and 12 in Fig. 1, said springs each having one extremity fixed to the base of the instrument 45 and a free extremity adapted to deflect in response to variations in internal pressure. Said free extremities of said Bourdon springs are individually linked to the opposite ends of a differential lever 48 pivotally mounted upon an arm 49 adapted for deflection through a limited angle about a bearing adjacent to one of its extremities.

The interior of the Bourdon spring 46 is connected by means of a capillary tube 50 to a relatively large and rapidly responding bulb 51, exposed to the liquid in the tank 40. The interior of the Bourdon spring 47 is connected by means of capillary tube 52 to a small and slowly responding bulb 53 in intimate thermal association with the bulb 51, and also exposed to the liquid whose temperature is to be regulated. The combination of Bourdon springs, bulbs and capillary tubes, together with the differential lever 48 carried upon the deflectable arm 49 constitutes a thermometer having a response characteristic similar to that set forth in connection with Fig. 1 of the drawings.

Carried by the free extremity of the arm 49 is a vane element 55 cooperating with an orifice member 56 having escape jets, not shown in the drawing, whereby said vane by changes in its position with respect to said jets will react to vary the back pressure of air escaping therefrom. A supply of compressed air from a conduit 57 is led through a constriction 58 to a conduit 59 in communication with the orifice member 56 and also with a bellows member or capsular spring 60 operatively associated with a three-way valve 61 of the supply-and-waste type. Compressed air from the conduit 57 is supplied to the valve 61, and the outlet of said valve is connected by means of a conduit 62 to the actuating element of the valve 43. The pneumatic control device as thus far described is the equivalent of that fully set forth in U. S. Letters Patent No. 1,880,247 granted October 4, 1932 to H. L. Griggs and A. R. Mabey; and the functioning is such that changes in the position of the vane 55 with respect to the orifice 56, affecting the back pressure therein due to a greater or less obstruction of the escape of air from the conduit 59 as admitted through the constriction 58, will produce corresponding variations in pressure within the bellows member 60, and thereby affect the setting of the valve 61 to modify the degree of opening of the valve 43.

Neglecting for the moment, the function of the Bourdon spring 47 and assuming the same to be stationary, it will be seen that, by suitable choice and proportioning of the elements of the apparatus as thus far set forth, there may be effected a regulation of temperature within the tank 40 as determined by the bulb 51 and modified by the degree of admission of heating agent through the conduit 41. When the function of the Bourdon spring 47 is taken into consideration, the thermometer system associated with the bulb 51 and the Bourdon spring 46 being suitably calibrated, the action will be such that, according to the principles hereinbefore set forth, the initial response of the vane 55 to any change in the temperature to be regulated will be first exaggerated, and subsequently withdrawn. This action will be reflected in the performance of the controller, wherein will be introduced a desirable "anticipatory" characteristic which has been found advantageous in meeting many problems of response delay in automatic control of temperature.

Figure 7:
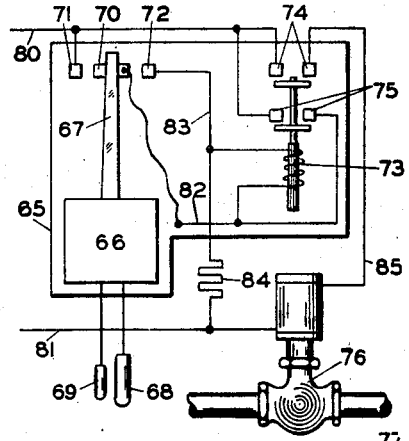
Fig. 7 illustrates the application of the invention to a conventional form of electrical control.

In Fig. 7 is diagrammatically shown an electrical circuit especially adapted to utilization of the principle of the invention for the purpose of automatic regulation of temperature. This circuit represents the well-known "thermostatic" control, in which a solenoid-actuated valve is alternatively opened and closed according to the demand for a temperature-affecting agent, with no mid-point or position of equilibrium. Mounted upon a base plate 65 is a differential mechanism 66 in all respects the equivalent of that shown in Fig. 1, and having a deflectable pointer arm 67 subject to the joint influence of temperature changes in two thermally associated bulbs 68 and 69, in a manner identical to the action of the bulbs 51 and 53 upon the pointer 49 in Fig. 6. In this arrangement said pointer is given performance characteristics similar to the curve G in Fig. 3, first overshooting the true value by a small increment and subsequently being withdrawn to a position corresponding to the actual temperature.

Carried upon the arm 67 is a contact member 70 adapted for electrical engagement with either of two fixed contacts 71—72, according to whether the temperature to which the bulbs 68 and 69 are exposed is below or above the desired value. Mounted upon the base 65 is a solenoid operated relay 73 having two sets of normally open contacts 74 and 75, both adapted to be closed upon energization of the solenoid of said relay. A solenoid-actuated valve 76 is installed in a pipe or conduit 77 whereby to control the flow of a heating agent through said conduit to an oven, tank, or other enclosed space (not shown in the drawing) wherein are located the bulbs 68 and 69. A source of electric power is represented by two conductors 80 and 81, of which the former is connected to the contact 71 and also to one side of each of the relay contacts 74, and 75 and the latter is connected to one terminal of the solenoid of the valve 76. The movable contact 70 carried by the arm 67 is connected by means of a conductor 82, having a flexible portion to permit free movement of the arm 67, to one terminal of the actuating solenoid of the relay 73, and also to the free terminal of the contact 75. The contact 72 is connected by means of a conductor 83 to the free terminal of the solenoid of the relay 73, and also to the line conductor 81 through a suitable current-limiting resistor 84. The free terminals of the relay contact 74 and the winding of the valve 76 are interconnected by means of a conductor 85.

By means well known in the art, and not shown in the drawings, the contacts 71 and 72 are made adjustable, and are set to positions where, at the desired value of the regulated temperature, the contact 70 will be juxtaposed to, but in engagement with neither of, said fixed contacts. It is in this relation that said contacts are shown in the drawings, the relay 73 and the valve 76 being deenergized, causing the latter to rest in its closed position.

It may now be assumed that the temperature to which the bulbs 68 and 69 are exposed is falling, whereupon the contact 70 will approach the contact 71. Neglecting for the moment the "anticipatory" action of the device, it will be seen that as said last-named contacts are brought into engagement a circuit will be completed by the same from the line conductor 80 through the conductor 82 and the solenoid of the relay 73, together with a portion of the conductor 83 and the resistance 84, to the line conductor 81, thereby energizing said solenoid in series with said resistor, and causing the contacts 74 and 75 to be closed. Closure of the contact 74 provides a path from the line conductor 80 through the conductor 85 and the solenoid of the valve 76 to the line conductor 81, thereby energizing said solenoid and opening said valve to admit heating agent to the space whose temperature is to be regulated. Closure of the contacts 75 provides a connection between the conductor 80—82 thereby shunting the contact 70—71, leaving the latter free to be separated by the motor of the arm 67 without interrupting the flow of current.

An increase of the temperature to be regulated, subsequent to, and consequent upon, the action initiated by engagement of the contacts 70—71 will thus produce no effect upon the control circuits until the arm 67 has deflected sufficiently far to bring contacts 70—72 together short-circuiting the solenoid of the relay 73 (current flow being limited to a safe value by the resistor 84) and causing said relay to be deenergized, opening its contacts 74 and 75, these contacts functioning respectively to deenergize and close the valve 76, and to interrupt the flow of current through the contacts 70—72 and the resistor 84. Under these conditions the control system becomes inert and no further action can be initiated until the contacts 70—72 are again closed.

The above-described system of electrical control, in the absence of the "anticipatory" action provided by the present invention, requires the provision, between the contact 70 and each of the contacts 71—72, of an operating space which, coupled with the characteristic time lag of thermally responsive systems of the conventional type, produces a zone of inactivity, with a corresponding band of temperature variation in which no regulation is obtained. When the dual action of first overshooting the true control point, and then withdrawing the surplus increment, as made possible by the differential combination of the bulbs 68—69, as hereinbefore set forth, is utilized, the performance of the electrically controlled valve 76 will be such as to anticipate, and therefore neutralize the characteristic delay of response. By properly selecting, proportioning and adjusting the component elements of the control system there may thus be provided a highly sensitive and critical control characteristic in accord with the objects of the invention.

It will be apparent that in a liquid-filled system constructed according to the principles of the invention, and so proportioned that the two Bourdon tubes are of equal strength, variations in hydrostatic pressure due to changes in elevation of the bulbs in relation to the instrument will tend to neutralize each other, with a consequent elimination of error due to such variations. It will further be obvious that changes in internal pressure due to ambient temperature of the Bourdon springs and capillaries will similarly be neutralized, with the resultant elimination of temperature error in the ultimate displacement of the index or pointer of the instrument.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus of the class described, the combination of two closed thermometer systems each comprising a bulb, a fluid-pressure-responsive element, and a tube operatively interconnecting the same, and each system containing an expansive fluid, said bulbs being adapted for simultaneous exposure to a temperature to be measured, a movable member, and means differentially connecting said responsive elements to said member for shifting the latter to positions corresponding to the difference in response of said elements, one of said systems having a response more rapid and of a magnitude greater than the rapidity and magnitude of response of the other system to the extent that the differential action of the two systems on said member will produce with a minimum of time lag a setting of said member representative of the actual temperature.

2. In apparatus of the class described, the combination of two closed thermometer systems each comprising a bulb, a fluid-pressure-responsive element, and a tube operatively interconnecting the same, and each system containing an expansive fluid, said systems having "different sensitivities" and different time-response characteristics and said bulbs being adapted for simultaneous exposure to a temperature to be measured, a scale, a pointer movable relatively to said scale, and means differentially connecting said responsive elements to said pointer for shifting the latter to positions along said scale corresponding to said temperature.

3. In apparatus of the class described, the combination of two closed thermometer systems each comprising a bulb, a fluid-pressure-responsive element, and a tube operatively interconnecting the same, and each system containing an expansive fluid, said bulbs being adapted for simultaneous exposure to a temperature to be measured, a scale, a pointer movable relatively to said scale, and means differentially connecting said responsive elements to said pointer for shifting the latter to positions along said scale corresponding to the temperature to which said bulbs are exposed, one of said systems having a response more rapid and of a magnitude greater than the rapidity and magnitude of response of the other system to the extent that the differential action of the two systems on the pointer will produce with a minimum of time lag an indication of the actual temperature.

4. Apparatus for regulating the temperature of a space, comprising two closed thermometer systems each having a bulb, a fluid-pressure-responsive element, and a tube operatively interconnecting the same, each system containing an expansive fluid, said systems having different sensitivities and different time-response characteristics, and said bulbs being adapted for simultaneous exposure to said temperature, a movable member, means differentially connecting said responsive elements to said member for shifting the latter to positions corresponding to the difference in response of said elements, and means controlled by said member for regulating the supply of a medium for affecting the temperature of said space.

5. Apparatus for regulating the temperature of a space, comprising two closed thermometer systems each having a bulb, a fluid-pressure-responsive element, and a tube operatively interconnecting the same, each system containing an expansive fluid, said systems having different sensitivities and different time-response characteristics, and said bulbs being adapted for simultaneous exposure to said temperature, a movable member, means differentially connecting said responsive elements to said member for shifting the latter to positions corresponding to the difference in response of said elements, and pneumatic means controlled by said member for regulating the supply of a medium for affecting the temperature of said space.

6. Apparatus for regulating the temperature of a space, comprising two closed thermometer systems each having a bulb, a fluid-pressure-responsive element, and a tube operatively interconnecting the same, each system containing an expansive fluid, said systems having different sensitivities and different time-response characteristics and said bulbs being adapted for simultaneous exposure to said temperature, a movable member, means differentially connecting said responsive elements to said member for shifting the latter to positions corresponding to the difference in response of said elements, and electrical means controlled by said member for regulating the supply of a medium for affecting the temperature of said space.

7. Apparatus for regulating the temperature of a space, comprising two closed thermometer systems each having a bulb, a fluid-pressure-responsive element, and a tube operatively interconnecting the same, said systems having different sensitivities and different time-response characteristics, and each system containing an expansive fluid, said bulbs being adapted for simultaneous exposure to a temperature to be measured, a movable member, means differentially connecting said responsive elements to said member, one of said thermometer systems being adapted upon change in said temperature to produce a response both rapid and of a magnitude greater than that of said change and to impart said response to a portion of said differential means, and the other of said thermometer systems being adapted upon a change in said temperature to respond to said change more slowly and to act upon said differential mechanism first to permit overshooting of said movable member under the influence of said first system and then to nullify said overshooting, and means controlled by said member for regulating the supply of a medium for affecting the temperature of said space.

8. Apparatus for regulating the temperature of a space, comprising two closed thermometer systems each having a bulb, a fluid-pressure-responsive element, and a tube operatively interconnecting the same, said systems having different sensitivities and different time-response characteristics, and each system containing an expansive fluid, said bulbs being adapted for simultaneous exposure to a temperature to be measured, a movable member, means differentially connecting said responsive elements to said member, one of said thermometer systems being adapted upon change in said temperature to produce a response both rapid and of a magnitude greater than that of said change and to impart said response to a portion of said differential means, and the other of said thermometer systems being adapted upon a change in said temperature to respond to said change more slowly and to act upon said differential mechanism first to permit overshooting of said movable member under the influence of said first system and then to nullify said overshooting, and pneumatic means controlled by said member for regulating the supply of a medium for affecting the temperature of said space.

9. Apparatus for regulating the temperature of a space, comprising two closed thermometer systems each having a bulb, a fluid-pressure-responsive element, and a tube operatively interconnecting the same, said systems having different sensitivities and different time-response characteristics, and each system containing an expansive fluid, said bulbs being adapted for simultaneous exposure to a temperature to be measured, a movable member, means differentially connecting said responsive elements to said member, one of said thermometer systems being adapted upon change in said temperature to produce a response both rapid and of a magnitude greater than that of said change and to impart said response to a portion of said differential means, and the other of said thermometer systems being adapted upon a change in said temperature to respond to said change more slowly and to act upon said differential mechanism first to permit overshooting of said movable member under the influence of said first system and then to nullify said overshooting, and electrical means controlled by said member for regulating the supply of a medium for affecting the temperature of said space.

10. In a thermometer system, the combination of two bulbs of differing characteristics as to both time-response and sensitivity, both adapted to attain a common temperature to be measured, and each containing an expansible fluid, two pressure-sensitive deformable elements, independent and mutually adjacent capillary tubes placing said bulbs individually and operatively in communication with said elements, and temperature-regulating means responsive to the joint influence of the deformations of said elements.

11. In a thermometer system, the combination of two bulbs of differing characteristics as to both time-responsive and sensitivity, both adapted to attain a common temperature to be measured, and each containing an expansible fluid, two pressure-sensitive deformable elements, independent and mutually adjacent capillary tubes placing said bulbs individually and operatively in communication with said elements, temperature-regulating means, and means differentially responsive to the joint influence of the deformations of said elements for controlling said regulating means.

12. In apparatus of of the class described, the combination of two closed thermometer systems each comprising a bulb, a fluid-pressure-responsive element, and a tube operatively interconnecting the same, and each system containing an expansive fluid, said bulbs being adapted for simultaneous exposure to a temperature to be measured, a movable member, means cooperating with said movable member in the production of an effect corresponding to a change in said temperature, and means differentially connecting said responsive elements to said member for shifting the latter to positions corresponding to the difference in response of said elements, one of said systems having a response more rapid and of a magnitude greater than the rapidity and magnitude of response of the other system to the extent that the differential action of the two systems on said member will produce with a minimum of time lag a setting of said member corresponding to the actual temperature.

LAWRENCE E. SMITH.

REFERENCES CITED

The following references are of record in the file of this patent:

UNITED STATES PATENTS

| Number | Name | Date |
|---|---|---|
| 1,289,435 | Fulton | Dec. 31, 1918 |
| 1,551,129 | Bast | Aug. 25, 1925 |
| 1,681,446 | Tice | Aug. 21, 1928 |
| 1,782,045 | Mason | Nov. 18, 1930 |
| 1,943,267 | DeGiers | Jan. 9, 1934 |
| 1,988,776 | Berghoefer | Jan. 22, 1935 |
| 1,994,983 | DeFlorez | Mar. 19, 1935 |
| 2,062,437 | Abbott | Dec. 1, 1936 |
| 2,171,895 | Sardeson | Sept. 5, 1939 |
| 2,176,603 | Belaeff | Oct. 17, 1939 |
| 2,211,672 | Reeder | Aug. 13, 1940 |
| 2,379,124 | Wasson | June 26, 1945 |

FOREIGN PATENTS

| Number | Country | Date |
|---|---|---|
| 240,089 | Germany | Oct. 28, 1911 |
| 664,699 | France | Apr. 29, 1929 |